No. 612,465. Patented Oct. 18, 1898.
C. A. TATUM.
GLASS MOLDING APPARATUS.
(Application filed Feb. 19, 1898.)
(No Model.)
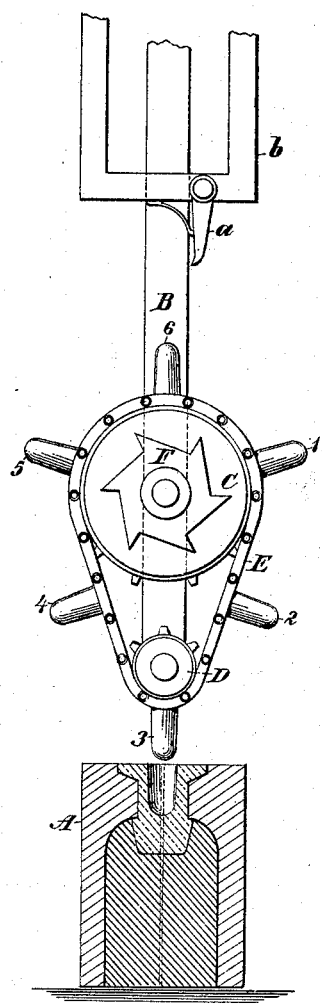
WITNESSES:
INVENTOR
Charles A. Tatum
BY Briesen & Knauth
ATTORNEYS

UNITED STATES PATENT OFFICE.

CHARLES A. TATUM, OF NEW YORK, N. Y., ASSIGNOR TO WHITALL, TATUM & CO., OF SAME PLACE.

GLASS-MOLDING APPARATUS.

SPECIFICATION forming part of Letters Patent No. 612,465, dated October 18, 1898.

Application filed February 19, 1898. Serial No. 670,936. (No model.)

*To all whom it may concern:*

Be it known that I, CHARLES A. TATUM, of the borough of Manhattan, city, county, and State of New York, have invented certain new and useful Improvements in Glass-Molding Apparatus, of which the following is a specification.

My invention relates to mechanism for molding glass initially—as, for instance, for producing the initial blank in a bottle-mold, which blank is afterward blown, as in the ordinary bottle-blowing machine.

My invention will be understood by referring to the accompanying drawing, in which the figure represented is a side elevation of a sufficient number of parts of a glass-molding machine to illustrate my invention.

In the accompanying drawing, A is a bottle-mold wherein the mass of glass is first placed and the neck of the bottle molded, the body of the bottle being thereupon blown from the mass of glass remaining below the neck of the bottle.

When a single plunger is employed, it soon becomes heated and thereby ineffective until allowed to cool, which ordinarily renders the operation slow. By my invention I employ successively a series of plungers, which are mounted upon an endless band, so that each individual plunger has an opportunity to cool before it is again put in action.

It will be understood that a series of molds A are employed, which are brought successively to meet a reciprocating bar or frame B. Journaled in the bar or frame B is a wheel C, which in the present instance is shown as a sprocket-wheel. Another wheel D, which is likewise shown in the present instance as a sprocket-wheel, is carried by the frame B. Coöperating with the sprocket-wheels C D is an endless band or sprocket-chain E, upon which is mounted a series of plungers 1, 2, 3, 4, 5, and 6, and suitable means are employed to automatically rotate said band. These means are shown to consist of a ratchet-wheel F, operatively connected to one of the wheels C D, and the teeth of the ratchet-wheel are adapted to be brought into contact with an abutment or pawl *a*, carried by a stationary portion *b* of the apparatus at each complete movement of the bar or frame B.

In operation a series of molds A are brought successively beneath the reciprocating bar or frame B, carrying the plungers, and at each descent a plunger is inserted into the mold to press or mold the neck of the bottle. After the neck is pressed the reciprocating frame B rises until the ratchet-wheel F is brought into contact with the pawl *a* and the endless band is rotated far enough to bring the next succeeding plunger into a vertical position, where, upon descent of the frame B, the said plunger will enter into a new mold, which has in the meantime been placed in position to receive the plunger. By these means any given plunger is used only once in a predetermined series of operations, so that as it leaves the pressing position and rotates around into position to be again used it may be thoroughly and efficiently cooled without the necessity of employing a circulation of air or water to mechanically cool the same.

It will be observed that by my invention any desired number of plungers may be employed and that the wheels which carry the band may be of any desired size or ratio to each other.

What I claim, and desire to secure by Letters Patent, is—

1. In a glass-pressing machine, the combination of a mold, a reciprocating frame in operative relation therewith, wheels carried by said frame, an endless band carried by said wheels, a plurality of plungers carried by said band and means for automatically moving said band to bring individual plungers into operative position successively.

2. In a glass-pressing machine, the combination of a mold, a reciprocating frame in operative relation therewith, sprocket-wheels carried by said frame and an endless sprocket-chain, coöperating with said wheels, a plurality of plungers carried by said sprocket-chain and automatically-operated means for rotating one of said sprocket-wheels to bring individual plungers into the operative position successively.

CHARLES A. TATUM.

Witnesses:
 GEO. E. MORSE,
 CHARLES E. SMITH.